United States Patent [19]

Kamiwaki et al.

[11] Patent Number: 4,890,721

[45] Date of Patent: Jan. 2, 1990

[54] BELT CLAMP TYPE UNLOADER

[75] Inventors: Tadayoshi Kamiwaki; Takumi Hoshika, both of Niihama, Japan

[73] Assignee: Sumimoto Heavy Industries, Ltd., Tokyo, Japan

[21] Appl. No.: 144,133

[22] Filed: Jan. 15, 1988

[30] Foreign Application Priority Data

Jan. 16, 1987 [JP] Japan .................................. 62-7689

[51] Int. Cl.4 ............................................ B65G 15/14
[52] U.S. Cl. ..................................... 198/626; 414/320; 414/326
[58] Field of Search ...................... 198/513, 518, 510.1, 198/512, 604, 611, 612, 626, 627; 414/139, 320, 326, 139.1, 142.2, 142.3, 142.4

[56] References Cited

U.S. PATENT DOCUMENTS

| 1,103,635 | 4/1914 | Vail | 198/626 X |
| 2,880,998 | 4/1959 | Middleton et al. | 198/626 X |
| 3,616,890 | 11/1971 | Pradon | 198/518 |
| 3,802,549 | 4/1974 | Kinsey | 198/627 X |
| 4,230,221 | 10/1980 | Beresinsky | 198/518 X |
| 4,425,995 | 1/1984 | Blattermann et al. | 198/626 X |
| 4,585,118 | 4/1986 | Plaut | 198/626 X |
| 4,738,350 | 4/1988 | Miller et al. | 414/139 X |

FOREIGN PATENT DOCUMENTS

| 54-100073 | 8/1979 | Japan . |
| 58-114232 | 8/1983 | Japan . |
| 163221 | 9/1984 | Japan .................................. 198/513 |

Primary Examiner—Frank E. Werner
Assistant Examiner—James R. Bidwell
Attorney, Agent, or Firm—Armstrong, Nikaido, Marmelstein, Kubovcik & Murray

[57] ABSTRACT

A belt clamp type unloader includes a vertical-horizontal conveyor assembly having a vertically extending portion and a horizontally extending portion, and a scraping section disposed at a position below a lower end of the conveyor assembly. In the conveyor assembly, two endless flat belts are combined such that their respective conveyance faces are superposed face-to-face with each other. Two tail pulleys are rotatably disposed at the lower ends of the vertically extending portions, and are spaced apart from each other transversely with respect to the direction of the breadth of the flat belt conveyor. A pair of pulleys which have a small diameter middle portion and large diameter opposite end portions are rotatably supported near to the lower ends of the flat belt conveyors but above the tail pulleys so as to press the flat belts into contact with each other, and another pulley is disposed at a bent portion at which the vertical portion meets the horizontal portion. The scraping section includes a pair of paddle feeders for spattering a material upwardly; and side covers for preventing the material from being scattered sideways. Accordingly, since it is ensured that a cross-sectional area suitable for conveyance is formed between the flat belts, any form of bulk material is stably and efficiently conveyed.

5 Claims, 2 Drawing Sheets

BELT CLAMP TYPE UNLOADER

BACKGROUND OF THE INVENTION

1. Field of the Invention

The present invention relates to unloaders of the type that include belt conveyors and scrapers disposed at an inlet end thereof and, more particularly, to a belt clamp type unloader capable of continuously conveying and discharging upwardly a bulk material such as a powder, a granular material, a viscous material, or a semi-fluid material.

2. Description of the Related Art

Such continuous type unloaders are widely used in discharging bulk materials such as cereals or fertilizers from the hold of a ship. This type of unloader is typically comprised of a scraper for scraping together the material and a vertical conveyor disposed at a position above the scraper for conveying the material either vertically or diagonally in the upward direction. A typical known type of scraper is constituted by a combination of a paddle feeder having a multiplicity of scraping plates around its periphery and a horizontal screw constituted by a spiral blade, as disclosed, for example, in Japanese Utility Model Unexamined Publication No. 58-114232. In Japanese Patent Unexamined Publication No. 54-100073, for example, a typical known type of vertical conveyor is disclosed which includes a pair of endless belts which are superposed with their respective conveyance faces facing each other, and which pair is vertically disposed; and a plurality of rollers so disposed as to press only the breadthwise sides of the superposed portions into contact with each other, the space between the breadthwise middle portions of the endless belts being allowed to expand freely. Also known is another conventional type of conveyor which employs a bucket elevator or a special belt with a laterally or wave-like ribbed side.

However, if any of the above-described conventional unloaders designed to discharge a grain- or powderlike material is employed to discharge a bulk material having a great degree of adhesivity such as dust coal, earth, sand, or ready-mixed concrete, the material will adhere to the inner surfaces of the buckets or the grooves in the special belts, and this may lead to critical problems hindering normal discharge operations. In the case of the bucket elevator type unloader, if the material to be discharged is continuously spattered up toward the buckets by means of the paddle feeder, the buckets can only retain a limited amount of material, and the spaces between the buckets do not contain any material. Therefore, the efficiency of conveyance is greatly restricted. In the case of the previously-mentioned unloader which includes a pair of superposed endless belts with their middle portions remaining free, it is difficult to positively form a cross-sectional area suitable for conveyance of the relevant material. Therefore, the material is not effectively gathered in the space between the middle portions of the belts; rather, it is scattered around. Otherwise, the material may impose an excessive load on the middle portions of the belts, with the result that the lifetime of the belts is inevitably reduced. Other examples of the related art include a screw type unloader adaptable to the discharge of a material having a great degree of adhesivity, or a pneumatic type unloader for discharging a light-weight grain- or powderlike materials. However, since these types of unloader consume large amounts of energy, it is difficult to apply them to conveyance of materials over long distances. In addition, all of the aforesaid unloaders are disadvantageous in that their mechanisms are complicated and expensive.

SUMMARY OF THE INVENTION

It is therefore an object of the present invention to provide an improved belt clamp type unloader capable of eliminating the above-described problems.

It is another object of the present invention to provide an improved belt clamp type unloader capable of easily, positively and continuously discharging even a bulk material having a great degree of adhesivity or a powder- or grain-like material which is lightweight and therefore easily scattered.

It is still another object of the present invention to provide an improved belt clamp type unloader which has a relatively simple mechanism, involves a reduced level of energy consumption, is low in cost, and exhibits improved conveying efficiency.

In order to accomplish the above and other objects, in accordance with the present invention, there is provided a belt clamp type unloader comprising two flat belt conveyors including conveyance faces which are mutually superposed, the flat belt conveyors being constituted by a vertically extending portion and a horizontally extending portion both of which are combined at an intermediate bend; a pair of paddle feeders disposed at a position below the lower ends of the flat belt conveyors; a pair of tail pulleys disposed at the lower ends of the flat belt conveyors and spaced apart from each other transversely with respect to the direction of the breadth of the flat belt conveyor so as to support corresponding flat belts of the flat belt conveyor; a pair of pulleys having a small diameter middle portion and large diameter opposite end portions and disposed at a position above the tail pulleys and in the vicinity of the lower ends of the flat belt conveyors so as to press the flat belts into contact with each other; side cover means for covering side openings formed between lower end portions of the flat belt conveyors which are progressively spaced apart from each other toward the lower ends; and a pulley disposed at the intermediate bent portion at which the vertically extending portion meets the horizontally extending portion, the pulley having a small diameter middle portion and large diameter opposite end portions.

DESCRIPTION OF THE PREFERRED EMBODIMENT

A preferred embodiment of the present invention will be described below with reference to the accompanying drawings.

Figure 1:
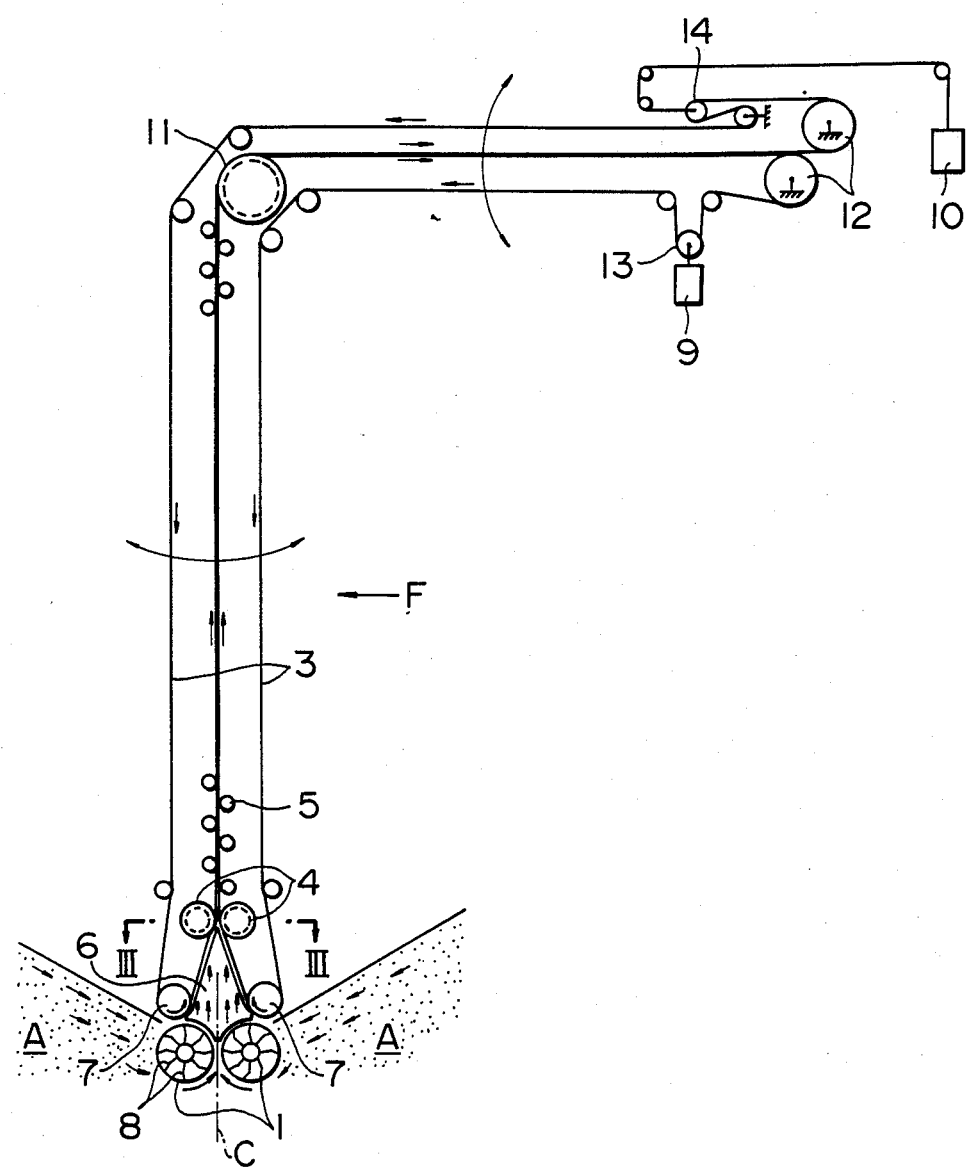
FIG. 1 is a diagrammatic side elevation illustrating the entire construction of a preferred embodiment of a belt clamp type unloader in accordance with the present invention.

In FIG. 1, there is shown a presently preferred embodiment of a belt clamp type unloader comprised of a vertical-horizontal conveyor assembly and a scraping section which is located at a position below the lower end of that conveyor assembly.

The vertical-horizontal conveyor assembly includes two endless flat belts 3 which are looped around independently of each other but in such a manner as to constitute an L-like configuration as a whole, and the two endless flat belts 3 are combined such that their respective conveyance faces 3a are superposed in face-to-face relationship with each other. A tail pulley 7 is disposed at the lower end of the vertical portion of each flat belt conveyor. The tail pulleys 7 are horizontally supported for rotation about their respective axes and spaced apart from each other by a predetermined distance in the direction transverse to the direction of the breadth of the flat belts 3. A pair of pulleys 4 (hereinafter referred to as "different-diameter pulleys") are supported for rotation about their respective axes at a location adjacent to the lower ends of the flat belt conveyors but generally above the tail pulleys 7. Th pair of different-diameter pulleys 4 are arranged to press the flat belts 3 into contact with each other.

Figure 3:
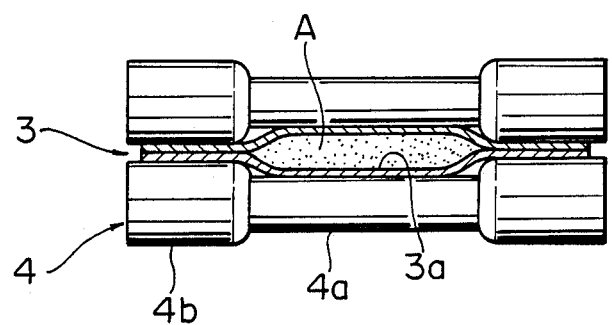
FIG. 3 is a cross-sectional view taken along line III—III of FIG. 1.

As clearly illustrated in FIG. 3, each of the different-diameter pulleys 4 is so formed that the external diameter of an axial middle portion 4a is smaller than the diameters of opposite ends 4b. While the flat belts 3 are passing through the nip between the different-diameter pulleys 4, the breadthwise sides of the flat belts 3 are clamped between the different-diameter pulleys 4 at the opposite ends 4b thereof, but the space between the middle portions 3a of the flat belts 3 is allowed to expand while being restricted by the peripheries of the small-diameter middle portions 4a of the different-diameter pulleys 4.

Similarly, a pulley 11 having a similar configuration to pulleys 4 (hereinafter referred to similarly as "different-diameter pulley") is disposed at a bent portion at which the vertical portion of the flat belt conveyor assembly meets the horizontal portion of the same.

Figure 2:
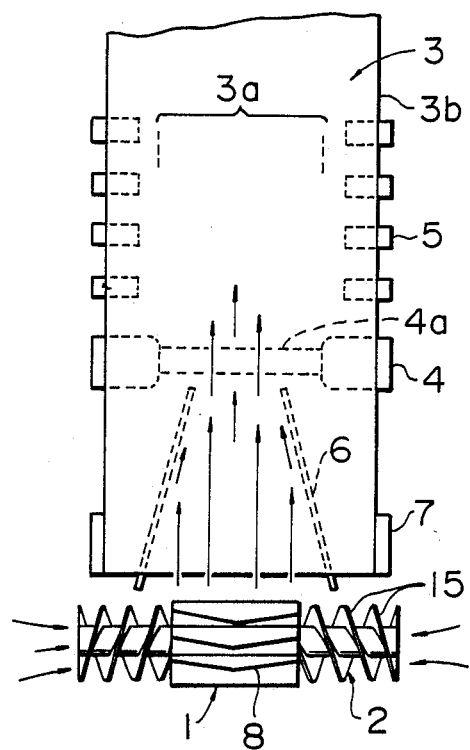
FIG. 2 is a diagrammatic fragmentary front elevation taken in the direction of the arrow F of FIG. 1.

A plurality of side pressing rollers 5 are staggered along the axis of the vertical portion between the different-diameter pulleys 4 located at the conveyor's lower end and the different-diameter pulleys 11 located at the bend, thereby clamping breadthwise sides 3b of the flat belts 3, as shown in FIG. 2, and pressing the sides 3b of the respective flat belts 3 into contact with each other. At an intermediate portion of the horizontal portion of the flat belt conveyor assembly, tension pulleys 13 and 14 are disposed in the vicinity of head pulleys 12 of the respective flat belts, and weights 9 and 10 are coupled to the tension pulleys 13 and 14, respectively.

As described previously, the pair of tail pulleys 7 are spaced apart from each other transversely with respect to the direction of the breadth of the flat belts 3. Therefore, the space between the lower end portions of the flat belt conveyors is progressively enlarged downwardly transversely with respect to the direction of the breadth of the flat belts 3. As viewed on either side of the flat belt conveyor assembly, an inverted V-like side opening is formed between the tail pulleys 7 and the different-diameter pulleys 4. In the space defined between the aforesaid inverted V-like side openings, a pair of side covers 6 are disposed such that their respective lower ends are close to the tops of paddle feeders 1 constituting a part of the scraping section which will be described later. As illustrated in FIG. 2, the side covers 6 are arranged in such a manner that the space therebetween is progressively reduced toward the top so that the material spattered upwardly by the paddle feeders 1 may be collected at a position corresponding to the breadthwise mid portion of the flat belt 3. It should be noted that the side covers 6 are preferably made of a material, such as hard rubber or a plastic, which does not scratch the surfaces of the flat belts 3.

The vertical portion of the flat belt conveyor assembly is capable of swinging about the axis of the bent portion of the L-shaped vertical-horizontal conveyor assembly, for example, within a range equivalent to an angle of about ±30 degree from its vertical position, and the horizontal portion of that flat belt conveyor assembly between the aforesaid bent portion and the head pulley 12 is also capable of moving up and down by a certain degree. In order to enable such a swinging motion, a cylinder device (not shown) or the like is disposed in the vicinity of the bent portion.

The scraping section is located at a position below the lower end of the above-described vertical-horizontal conveyor assembly. The scraping section includes the paddle feeders 1 each having a multiplicity of scraping plates 8 which are radially mounted for spattering up a material A toward a bottom opening of the flat belt conveyor assembly and horizontal screws 2 which are mounted in such a manner as to extend longitudinally from the opposite ends of the paddle feeders 1, coaxially with and for integral movement with the respective paddle feeders 1, each horizontal screw 2 having spiral blades 15 for scraping together the material A toward the paddle feeders 1. In the presently preferred embodiment, by way of example, the paddle feeders 1 are arranged in a pair and the respective horizontal screws 2 has a plurality of spiral blades 15.

The pair of paddle feeders 1 are arranged in such a manner that the rotation axes thereof are parallel to each other and to the respective rotation axes of the tail pulleys 7, as well as in such a manner as to exhibit symmetry with respect to a central axis C of the vertical portion of the conveyor assembly.

In order that the material A may be completely discharged without involving any damage to the bottom of a ship, a cushioning material such as a rubber plate may be mounted on the peripheral edges of the spiral blades 15 of the horizontal screw 2 and/or the outer edges of the scraping plates 8 of the paddle feeders 1, but the kind of cushioning material is not confined to this one. For instance, the entire bodies of the spiral blades 15 and the scraping plates 8 may be made of a cushioning material such as hard rubber or a plastic.

In the above-described arrangement, when the pair of paddle feeders 1 and the horizontal screws 2 are made to rotate in the directions indicated by corresponding arrows, the material A is scraped from the breadthwise sides of the scraping section toward the paddle feeders 1, and in turn is spattered upwardly by the centrifugal forces generated by the rotation of the paddle feeders 1. In this fashion, the material A is scraped together from the breadthwise sides and is spattered up toward the flat belt conveyor assembly. Therefore, it becomes possible to perform scraping at a constant rate irrespective of the state of the material A which surrounds the scraping section. Unlike the related art conveyors, since the material A is prevented from being scattered sideways, the amount of residual load after unloading can be minimized.

The material A which has been spattered up by the paddle feeders 1 is passed through the opening of the lower end of the flat belt conveyor assembly and in turn is captured by the space expanded between the middle portions 3a of the flat belts 3 which are nipped by the different-diameter pulleys 4. The movements of the flat belts 3 cause the thus-captured material A to be moved upwardly by the frictional force acting between the material A and the flat belts 3. Then, the material A is conveyed through the horizontal portion to the outlet end of the conveyor apparatus, and in turn is discharged through that outlet end.

In the presently preferred embodiment, the presence of the small-diameter middle portions of the different-diameter pulleys 4 allows the breadthwise middle portion of each flat belt 3 to be made concave in cross section between the tail pulleys 7 and the different-diameter pulleys 4 as the flat belts 3 proceed toward the pulleys 4. Therefore, the concave portions and the side covers 6 cooperate with each other to collect the spattered material A toward the breadthwise middle portion. In addition, the presence of the side covers 6 prevents the material from scattering sideways. After the flat belts 3 have passed through the nip between the different-diameter pulleys 4, the pulleys 4 cooperate with the side pressing rollers 5 to ensure that a cross-sectional area suitable for conveyance can be formed between the flat belts 3. In addition, the amount of the material A which can be captured in the space between the flat belts 3 is limited by the distance between the middle portions 4a of the pair of different-diameter pulleys 4. Accordingly, unlike the related art conveyor apparatus, no overload is applied to the belts.

Also, a suitable magnitude of tension is applied to the flat belts 3 by the weights 9 and 10. Although the flat belts 3 are varied in length by the previously-described swinging and vertical movements, such length variations are absorbed by the displacements of the weights 9 and 10 so that the length of each flat belt is constantly automatically adjusted to an optimum value.

As described above, in accordance with the present invention, the material is collected from the breadthwise opposite sides to the middle portion by the motion of the horizontal screws and is spattered toward an area above the middle portion by the puddle feeders. The breadthwise middle portion of each flat belt is smoothly made concave by cooperation between the tail pulleys and the different-diameter pulleys, and, after the flat belts have passed through the nip between the different-diameter pulleys, a cross-sectional area suitable for conveyance is positively formed between the flat belts. Accordingly, bulk material is stably and efficiently conveyed. Additionally, since two paddle feeders are employed in the present invention, no variation takes place in conveyance capacity. Moreover, since the paddle feeders are arranged to rotate in mutually opposite directions, the material is not scattered sideways and thus the material can advantageously be discharged to such an extent that the amount of the remaining material is minimized. Furthermore, since the arrangement of the present conveyor apparatus is simpler than the arrangement of the related art apparatus, a failure rate is reduced. It will be appreciated that the unloader of the present invention is useful in applications to not only the unloading of bulk material from self-unloading ships but also the conveyance of ready-mixed concrete in construction sites of dams or buildings, the input of cereals to silos, or any other upward conveyance operations.

While the invention has been particularly shown and described with reference to a certain preferred embodiment, it will be understood by those skilled in the art that various alterations and modifications in form and detail may be made therein. Accordingly, it is intended that the following claim covers all such alterations and modifications as fall within the true spirit and scope of the invention.

What is claimed is:

1. A substantially L-shaped unloader comprising:
   a pair of endless belt conveyors each having an endless belt and arranged in parallel along substantially a whole longitudinal length thereof while contacting an outside surface of one endless belt with an outside surface of the other endless belt, said pair of endless belt conveyors extending vertically from a first end thereof and further extending horizontally from substantially a middle section thereof, said pair of endless belt conveyors being gradually separated from each other at a vicinity of said first end toward said first end such that a clearance therebetween forms substantially an isosceles triangle;
   a pair of paddle feeders positioned immediately below said first end such that a bulk material fed by said pair of paddle feeders can be raised and conveyed by a wedge effect produced by the gradual separation of said pair of endless belt conveyors;
   a pair of opposing first pulleys provided at said vicinity for holding said pair of endless belts of said endless belt conveyors therebetween, each of said pair of first pulleys having small diameter sections at a center thereof and a pair of large diameter sections at both ends thereof such that said pair of endless belts held by said pair of first pulleys forms a substantially clearance at a middle section thereof;
   a pair of covering means for covering side clearances between said pair of endless belts, each having a shape of a substantially isosceles triangle for covering said first end;
   a second pulley arranged at an intersection between said vertical extending portion and said horizontally extending portion of said endless belt conveyors, said second pulley having a small diameter section at a center thereof and a pair of large diameter sections at both ends thereof; and
   a plurality of side pressing rollers arranged in staggered relationship along the vertically extending portion of said endless belt conveyors between said pair of first pulleys and said second pulley to claim both sides of said pair of endless belts, wherein said pair of first pulleys, said pair of covering means and said pair of paddle feeders are symmetrically arranged around a central axis of said vertically extending portion of said endless belt conveyors.

2. The substantially L-shaped unloader of claim 1, wherein said pair of covering means is arranged in a manner that a distance between said pair of covering means gradually increases toward said first end.

3. The substantially L-shape unloader of claim 1, wherein a diameter of said large diameter sections of each of said pairs of first pulleys and said second pulley is substantially larger than a diameter of each of said plurality of side pressing rollers.

4. The substantially L-shaped unloader of claim 1, wherein each of said covering means further has a bottom side having a projected portion at a center thereof.

5. The substantially L-shaped unloader of claim 4, wherein each half side of said bottom side divided by said projected portion is an arc substantially identical to a circular contour of each of said pair of paddle feeders.

* * * * *